US012812317B2

(12) United States Patent
Pham et al.

(10) Patent No.: US 12,812,317 B2
(45) Date of Patent: Nov. 24, 2026

(54) MULTI-CHANNEL SPATIAL AUDIO OVER STEREO AUDIO DEVICES

(71) Applicant: THX Ltd., Novato, CA (US)

(72) Inventors: Hong Cong Tuyen Pham, Singapore (SG); M'hand Zacharie Amo Boughias, Camphin-en-Carembault (FR)

(73) Assignee: THX Ltd., Novato, CA (US)

( * ) Notice: Subject to any disclaimer, the term of this patent is extended or adjusted under 35 U.S.C. 154(b) by 65 days.

(21) Appl. No.: 19/022,189

(22) Filed: Jan. 15, 2025

(65) Prior Publication Data

US 2026/0205752 A1 Jul. 16, 2026

(51) Int. Cl.
*H04S 7/00* (2006.01)
*H04S 1/00* (2006.01)

(52) U.S. Cl.
CPC ................ *H04S 7/30* (2013.01); *H04S 1/007* (2013.01); *H04S 2400/01* (2013.01)

(58) Field of Classification Search
CPC ......... H04S 7/30; H04S 1/007; H04S 2400/01
See application file for complete search history.

(56) References Cited

U.S. PATENT DOCUMENTS 5,742,689 A 4/1998 Tucker et al.
9,788,096 B2 10/2017 Zhang et al.
10,075,795 B2 9/2018 Lee et al.
10,491,643 B2 11/2019 Brown et al.
2010/0054508 A1 3/2010 Yang
(Continued)

FOREIGN PATENT DOCUMENTS

CN 201328181 Y 10/2009
CN 106131745 A 11/2016
(Continued)

OTHER PUBLICATIONS

International Search Report and Written Opinion mailed Mar. 13, 2026 for International Application No. PCT/US2026/010973, 11 pages.

(Continued)

*Primary Examiner* — Paul Kim
(74) *Attorney, Agent, or Firm* — Schwabe, Williamson & Wyatt, P.C.

(57) ABSTRACT

The present disclosure provides a method for processing a multichannel audio signal for playback over a stereo audio device through an operating system. The method includes receiving the multichannel audio signal containing spatial audio information representing sound positioning in three-dimensional space. A monitoring service monitors an audio format request for a number of channels issued by an audio engine to virtual audio processing components or an audio driver. The monitoring service returns an audio format response to the audio engine in place of a response from the audio driver, indicating that the number of supported channels is greater than eight. The multichannel audio signal is processed by virtual audio processing components to generate a processed multichannel audio signal for stereo audio device playback. The processed multichannel audio signal is then output for playback over the stereo audio device.

20 Claims, 10 Drawing Sheets

(56) References Cited

U.S. PATENT DOCUMENTS

| | | | | |
|---|---|---|---|---|
| 2010/0329466 | A1* | 12/2010 | Berge | H04R 3/12<br>381/22 |
| 2018/0210695 | A1 | 7/2018 | Tsingos et al. | |
| 2018/0262858 | A1 | 9/2018 | Noh et al. | |
| 2022/0191638 | A1 | 6/2022 | Stengel et al. | |
| 2022/0369058 | A1* | 11/2022 | Lee | H04S 3/008 |
| 2023/0066209 | A1 | 3/2023 | Greff et al. | |
| 2024/0048935 | A1 | 2/2024 | Virolainen et al. | |
| 2024/0259757 | A1 | 8/2024 | Dublon et al. | |

FOREIGN PATENT DOCUMENTS

| | | | |
|---|---|---|---|
| CN | 107347173 | A | 11/2017 |
| CN | 111034215 | A | 4/2020 |
| CN | 114745636 | A | 7/2022 |
| KR | 2057684 | B1 | 12/2019 |
| WO | 2001/050598 | A2 | 7/2001 |

OTHER PUBLICATIONS

S. Arthi et al., "Binaural Spatial Audiometry Screening Using Android Mobile Device Audio I/O Facility," 2020 National Conference on Communications (NCC), Kharagpur, India, 2020, pp. 1-6.

* cited by examiner

600

MULTI-CHANNEL SPATIAL AUDIO OVER STEREO AUDIO DEVICES

FIELD OF INVENTION

The present disclosure relates to audio processing systems, and more particularly to a multi-channel spatial audio over stereo audio devices such as headphones or stereo speakers.

BACKGROUND

Audio technology has advanced significantly in recent years, with a focus on creating immersive listening experiences. Traditional stereo systems have given way to more sophisticated surround sound setups, allowing listeners to experience audio from multiple directions. These setups typically involve multiple speakers arranged around the listener in a horizontal plane, such as 5.1 or 7.1 configurations, where the numbers represent the quantity of full-range speakers and subwoofers, respectively.

As consumer demand for more realistic and immersive audio experiences has grown, the audio industry has responded with increasingly complex speaker configurations. The introduction of height channels has added a new dimension to surround sound, allowing for the reproduction of sounds from above the listener. This advancement has led to the development of formats like 7.1.4, which includes seven surround speakers, one subwoofer, and four height speakers.

The proliferation of these advanced audio formats has created challenges for content creators and consumers alike. While movie theaters and high-end home entertainment systems can accommodate multiple speakers, many users are limited by space, budget, or practicality in their ability to set up complex speaker arrays. This limitation has driven the need for solutions that can deliver immersive audio experiences through more accessible means, such as headphones or standard stereo speaker setups.

Many software solutions have emerged claiming to provide virtual surround sound on headphones or regular speakers. Some commercially available audio products are designed to simulate multi-channel audio through limited output devices. However, these solutions typically rely on a planar setup of virtual speakers, mimicking traditional 4.0, 5.1, or 7.1 configurations. While these approaches can enhance the listening experience, they often fall short of truly replicating the three-dimensional soundscape that modern audio formats are capable of producing.

Spatial audio technology has pushed beyond the limitations of planar setups by incorporating sound sources above the listener. The increasing adoption of spatial audio in movies and games has made formats like 7.1.4 more prevalent, even in the absence of specific encoders. Some operating systems, such as macOS, now decode various audio formats to 7.1.4 by default. Additionally, many modern games allow users to experience 7.1.4 audio, provided they have the necessary hardware—typically a dedicated 12-channel sound card and a corresponding speaker setup.

To address the hardware limitations faced by many users, some market solutions have introduced proprietary formats and decoding algorithms. Systems like Dolby Atmos and DTS:X offer methods to deliver spatial audio experiences through stereo devices such as headphones or standard speakers. These solutions employ specialized encoders and proprietary decoding algorithms to simulate a multi-dimensional soundstage.

Despite these advancements, significant challenges remain in delivering truly immersive spatial audio experiences to a broad audience. The requirement for specialized hardware or proprietary formats limits accessibility, while software solutions that work with standard equipment often struggle to accurately reproduce the full dimensionality of modern audio formats. As a result, there is a growing need for more flexible and widely compatible approaches to spatial audio virtualization that can bridge the gap between complex multi-speaker setups and common stereo playback devices.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present disclosure provides a method and system for processing multichannel audio signals for playback over headphones, utilizing a monitoring service to enhance spatial audio capabilities. The method intercepts audio format requests or responses between an audio engine and audio drivers, and modifying them to indicate support for more than eight channels. This enables the processing of spatial audio information representing three-dimensional sound positioning through virtual audio processing components, such as Audio Processing Objects (APOs) or Virtual Audio Devices (VADs), for example, delivering an immersive binaural audio experience for users of stereo audio devices without requiring specialized hardware.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
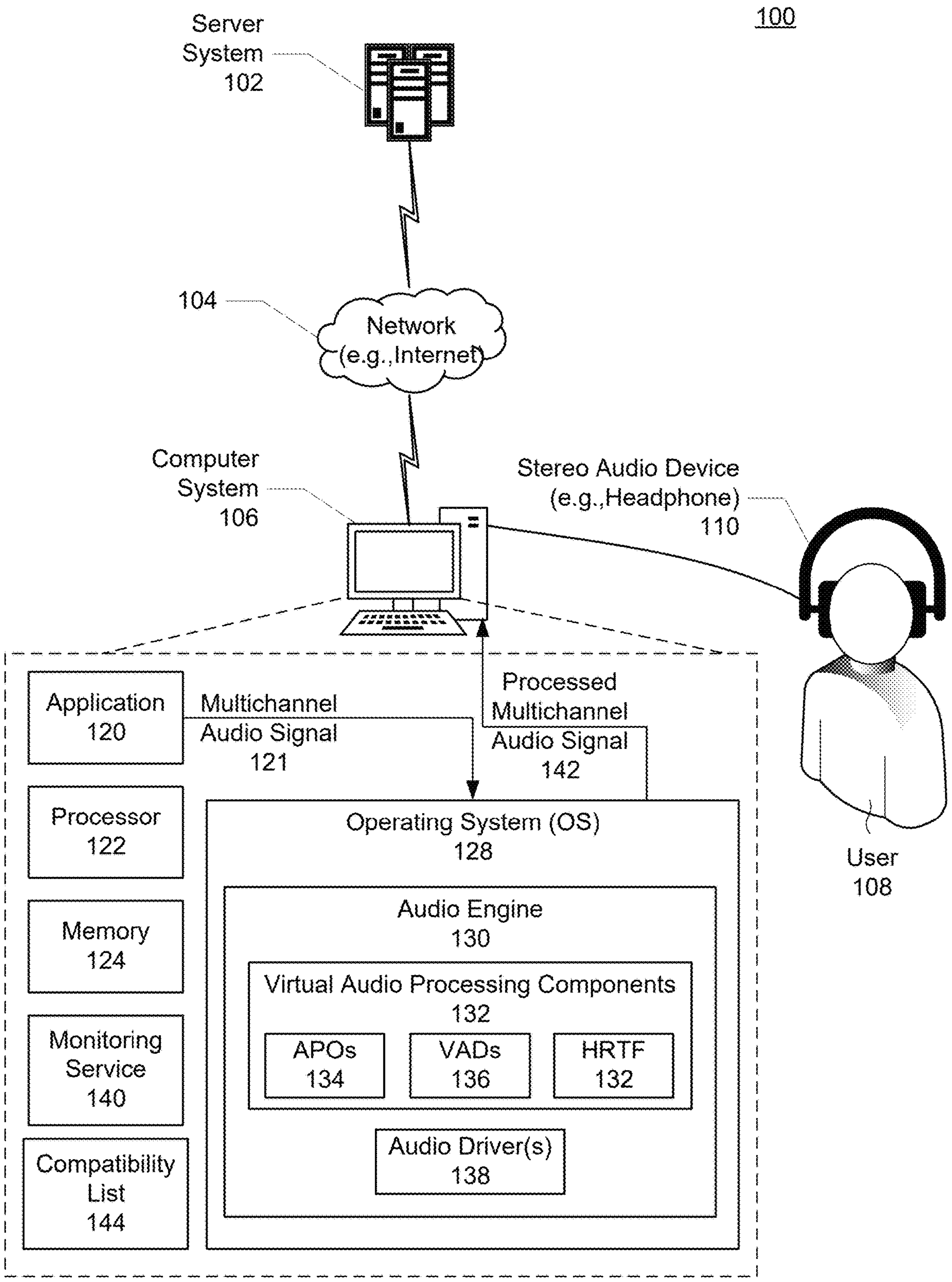
FIG. 1 illustrates a block diagram of an audio processing system, according to aspects of the present disclosure.

FIG. 1 illustrates an audio processing system 100 according to various embodiments. The system includes a server system 102 connected through a network 104 to a computer system 106. The computer system 106 connects to a stereo audio device 110, such as a headphone worn by a user 108 or stereo speakers. The network 104 may comprise the internet, a cellular communications network, or any other suitable communication network.

The computer system 106 may include a processor 122 and a memory 124 storing instructions for executing various audio processing tasks. In some cases, the processor 122 may comprise one or more processing devices such as GPUs, CPUs, PPUs, or variations thereof. The computer system 106 may be any type of computing device such as a desktop computer, a laptop, a game console, an audio/video receiver, or a media player.

An application 120 executed by the computer system 106 sends a multichannel audio signal 121 to operating system (OS) 128, and more specifically to audio engine 130 of OS 128, for playback of spatial audio through stereo audio device 110. Spatial audio adds speakers and sound sources above the listener in addition to planar sources. The application 120 may generate the multichannel audio signal 121 or may receive the multichannel audio signal 121 from server system 102 through a network 104 to a computer system 106. The multichannel audio signal 121 may contain spatial audio information representing sound positioning in a three-dimensional space. In some cases, the multichannel audio signal 121 may comprise a format such as 7.1.4. The application 120 may comprise one or more computer programs, such as a video game, music application, or video application.

The audio engine 130 processes the multichannel audio signal 121 using virtual audio processing components 132, and the processed multichannel audio signal 142 is then output by the audio engine 130. The virtual audio processing components 132 may include audio processing objects (APOs) 134, virtual audio devices (VADs) 136, and/or head-related transfer functions (HRTFs). APOs 134 may be software components that perform digital signal processing on audio streams. VADs 136 may be software-based audio endpoints that can emulate physical audio devices. HRTFs may be mathematical functions that characterize how an ear receives sound from a point in space, used to create spatial audio effects. These components may work together to process multichannel audio signals and create immersive listening experiences through stereo output devices.

An audio driver 138 may generate an output audio signal based, at least in part, on the output of the audio engine 130 and the virtual audio processing components 132. In some aspects, the audio driver 138 may comprise software components that enable communication between the operating system and audio hardware. The audio driver 138 may provide an interface for encoding and decoding digital audio data, and may handle tasks such as audio format conversion, sample rate adjustment, and channel mapping. In some cases, the audio driver 138 may also implement digital signal processing algorithms for audio enhancement or effects. The audio driver 138 may play a role in the audio format negotiation process by communicating supported audio formats and capabilities to other components of the audio processing system.

The computer system 106 may include an output port (not shown) such as a stereo headphone output port or a wireless communications link for headphone playback. As used herein, the term stereo audio device 110 is intended to include, stereo speakers, headphones, earbuds, in-ear monitors, bone conduction headphones, dual hearing aids, wireless earphones, such as true wireless stereo (TWS) earbuds, and smart glasses with integrated audio capabilities.

The processed multichannel audio signal 142 may simulate physical properties of sound in the real world, such as sound propagation, direction, attenuation, and interactions. In some cases, the processed multichannel audio signal 142 may be a digital binaural audio signal. The processed multichannel audio signal 142 may comprise an audio stream and/or be stored as a computer file in formats such as WAV, M4A, FLAC, MP3, or AAC.

As described further below, a monitoring service 140 executed by the computer system 106 monitors and detects audio format requests made by the application 120 to the audio engine 130 to determine the number of channels supported. For playback over the stereo audio device 110, the audio engine 130 typically returns a standard format response indicating that the number of channels supported for stereo audio device 110 playback is two (stereo). According to the disclosed embodiments, the monitoring service 140 replaces this standard stereo audio format response with an audio format response indicating that the number of channels supported is 8 or greater, enabling the processing of multichannel spatial audio for headphone playback.

The monitoring service 140 may be implemented in various ways to effectively intercept and modify audio format negotiations between applications and the audio system. In some aspects, the monitoring service 140 may be configured as a plugin to the operating system (OS) 128. This configuration may allow the monitoring service to integrate seamlessly with the OS's audio subsystem, intercepting audio format requests and responses at a low level.

In other implementations, the monitoring service 140 may be integrated directly into the audio engine 130. This approach may provide the monitoring service with direct access to the audio processing pipeline, allowing it to modify format negotiations before they reach the application or audio driver layers. Alternatively, the monitoring service 140 may be implemented as a component of the audio driver 138. In this configuration, the monitoring service may intercept and modify audio format responses before they are sent back to the application, ensuring that multichannel audio capabilities are reported even for stereo output devices.

In some cases, the monitoring service 140 may be developed as a separate application that runs alongside other system processes. This implementation may offer greater flexibility and easier user configuration, allowing users to enable or disable the service as needed.

The monitoring service 140 may also be designed as a middleware layer that sits between the application and the audio subsystem. This approach may allow the service to intercept and modify audio format negotiations without requiring modifications to the OS or audio drivers. In certain implementations, the monitoring service 140 may utilize system hooks or API interception techniques to monitor and modify audio format requests and responses. This method may allow the service to function across different OS versions and audio subsystems without requiring deep integration into system components. The monitoring service 140 may also be implemented as a combination of these approaches, with different components operating at various levels of the audio stack to provide comprehensive coverage of audio format negotiations.

The monitoring service 140 may utilize an application compatibility list 144 to track which applications are compatible with the monitoring or forcing multichannel spatial audio processing, and which are not. The application compatibility list 144 may include a whitelist of compatible applications and/or a blacklist of incompatible applications. The application compatibility list 144 may be stored in memory 124 and updated periodically to reflect the latest compatibility information. In some cases, the application compatibility list 144 may include identifiers for specific applications, such as executable names, process IDs, or other unique identifiers.

When application 120 initiates an audio format request, the monitoring service 140 may consult the application compatibility list 144 to determine whether to intercept and modify the audio format response. For compatible applications, the service may proceed with replacing the standard stereo format response as described. In cases where an application is identified as incompatible, the monitoring service 140 may allow the standard stereo format response to pass through unmodified.

The application compatibility list 144 may be updated through various means, such as automatic updates from a remote server, manual updates by the user, or through machine learning algorithms that analyze application behavior and performance with multichannel audio processing. This approach may help optimize system performance and ensure that the spatial audio virtualization is applied selectively to applications that can benefit from it.

Figure 2:
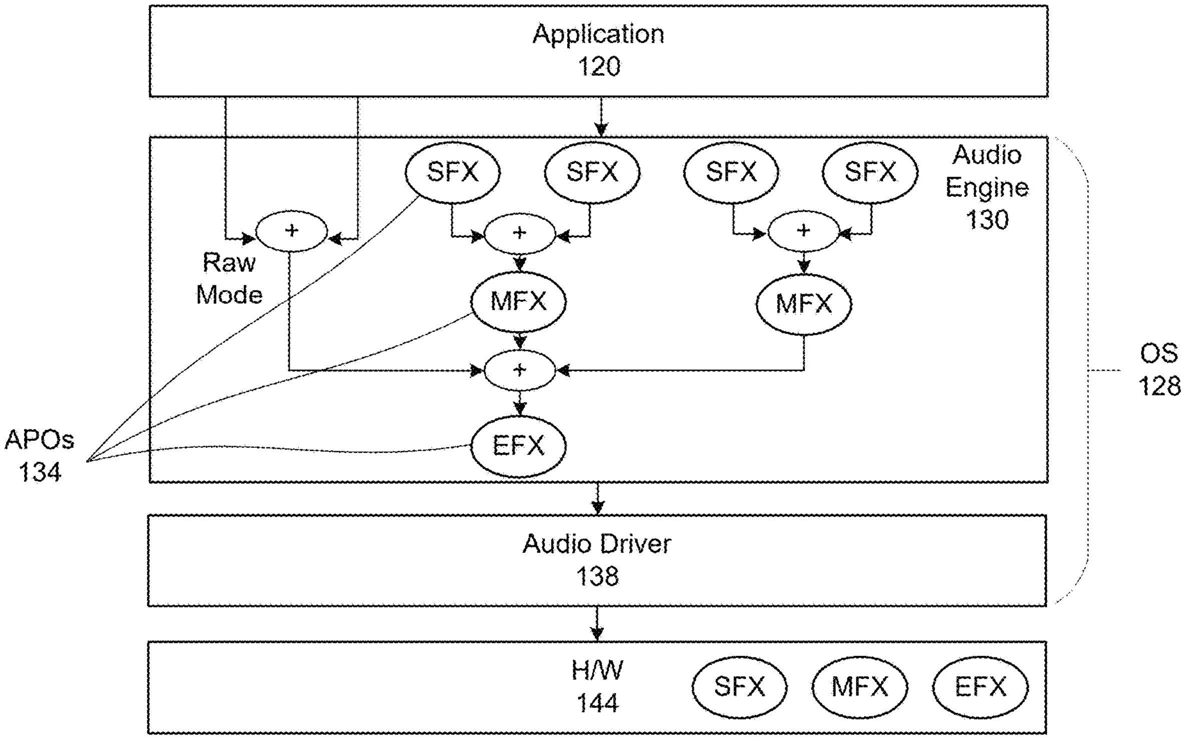
FIG. 2 illustrates a block diagram of an audio processing system architecture, according to an embodiment.

FIG. 2 illustrates a block diagram of an example audio processing system architecture for audio streams for Windows OS®. The audio processing system architecture shows application 120 at the top level that interfaces with OS 128. Within OS 128, audio engine 130 may process audio signals through multiple stages of audio processing objects (APOs) 134. The flow of audio signals through the system begins at the application 120, which sends audio data to OS 128. Within OS 128, audio engine 130 receives the audio data and directs it through the various APOs 134 for processing.

APOs 134, which comprise virtual audio processing components 132, may include stream effects (SFX), mode effects (MFX), and endpoint effects (EFX) arranged in a processing chain. The audio engine 130 may also process audio in raw mode, bypassing some effects processing. The processed audio signals may flow from the audio engine 130 to the audio driver 138.

The audio driver 138 may interface with a hardware interface 145, which may contain its own set of SFX, MFX, and EFX processing capabilities. Each type of APO 134 serves a specific function in the audio processing chain: 1) Stream Effects (SFX) APOs process the audio on a per-stream basis. These APOs are instantiated for each application stream, allowing for application-specific processing. SFX APOs can modify channel count before mixing occurs, for managing different audio sources within a single system. 2) Mode Effects (MFX) APOs process the mixed audio stream. They apply effects that are consistent across all audio streams in a particular mode, such as music mode or movie mode. This ensures that the audio output maintains a consistent quality and character across different playback scenarios. 3) Endpoint Effects (EFX) APOs process the final audio output before it reaches the audio endpoint, in this case, headphones. These effects are applied to all audio regardless of its source or mode, ensuring that the final output is optimized for the end-user's listening device.

The audio engine 130 routes the processed audio to the audio driver 138, which then transmits the audio to the hardware interface 145. The hardware interface 145 may include additional processing capabilities, further refining the audio before it is output to the stereo audio device 110.

The virtual audio processing components 132 in the system may also include virtual audio devices (VADs) 136 that emulate physical audio devices. This allows the system to simulate various audio hardware configurations and provides flexibility in how audio is routed and processed within the system.

Additionally, the system may include virtual audio processing components 132 configured to operate with different operating systems, such as macOS or Linux, each of which may support different types of audio unit effects. For macOS, the virtual audio processing components 132 may include Audio Units (AUs) like AUPitch, AUDelay, or AUDynamicsProcessor. For Linux, the virtual audio processing components 132 may include LADSPA (Linux Audio Developer's Simple Plugin API), a plugin standard for audio effects and filters. Such audio unit effects may contribute to the overall processing of spatial audio information, ultimately outputting a binaural format suitable for headphone playback.

Figure 3:
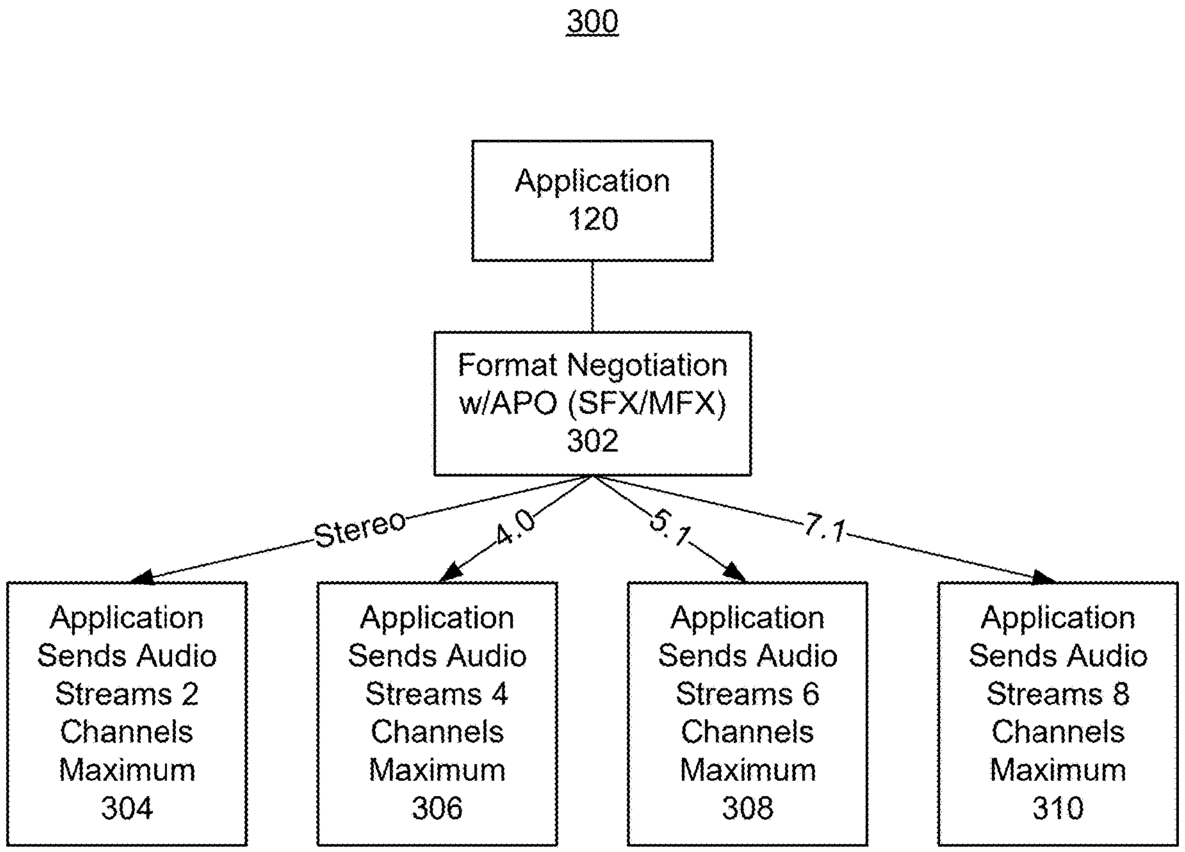
FIG. 3 illustrates a flowchart of a method for audio format negotiation, in accordance with example embodiments.

FIG. 3 illustrates a flowchart of method 300 for audio format negotiation in the audio processing system. The method 300 may begin with the application 120 initiating audio playback by requesting a specific audio format from the audio engine 130.

The audio engine 130 may then handle the format negotiation (block 302) with one or more of the virtual processing components 132, such as audio processing objects (APOs) 134, to determine the supported formats and to settle on a mutually compatible format.

The virtual processing components 132 may respond with one possible outcome based on different audio format configurations. For example, the virtual processing components 132 may respond with an audio format of two channels or "Stereo" to play the audio over the stereo audio device 110. In response, the application 120 may send audio streams with two channels maximum (block 304). In some cases, the virtual processing components 132 may respond with an audio format of "4.0", and in response, the application 120 may send audio streams with 4 channels maximum (block 306). In some cases, the virtual processing components 132 may respond with an audio format of "5.1", and in response, the application 120 may send audio streams with 6 channels maximum (block 308). In some cases, the virtual processing components 132 may respond with an audio format of "7.1", and in response, the application 120 may send audio streams with 8 channels maximum (block 310).

Figure 4A:
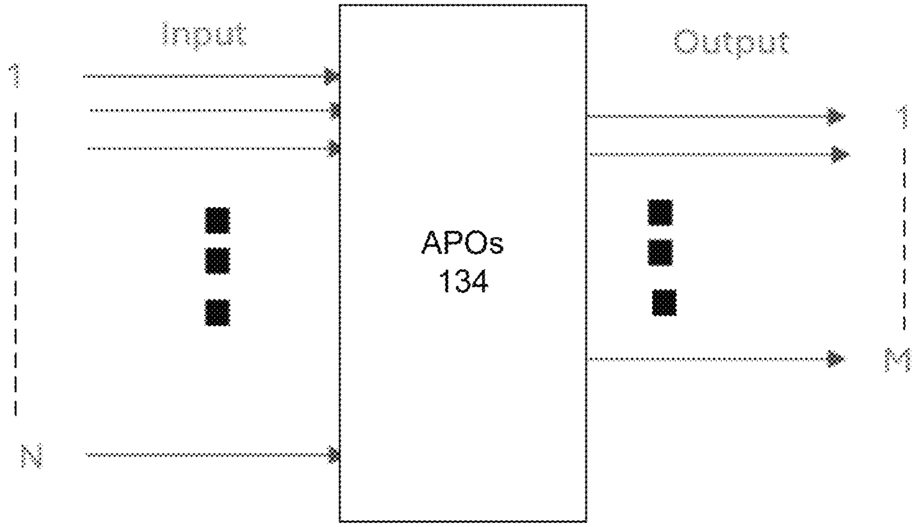
FIG. 4A illustrates a block diagram of audio processing objects with multiple input and output channels, according to an aspect of the present disclosure.

FIG. 4A illustrates a block diagram of audio processing objects (APOs) 134 according to various embodiments. APOs 134 may receive N input channels and produce M output channels. The APOs 134 may be configured to process multiple input audio channels, labeled from 1 to N, where N represents the total number of input channels. The APOs 134 may output processed audio signals through multiple output channels, labeled from 1 to M, where M represents the total number of output channels. The APOs 134 may perform audio signal processing operations to convert the N input channels to M output channels, where N and M can be different values depending on the desired audio configuration.

Figure 4B:
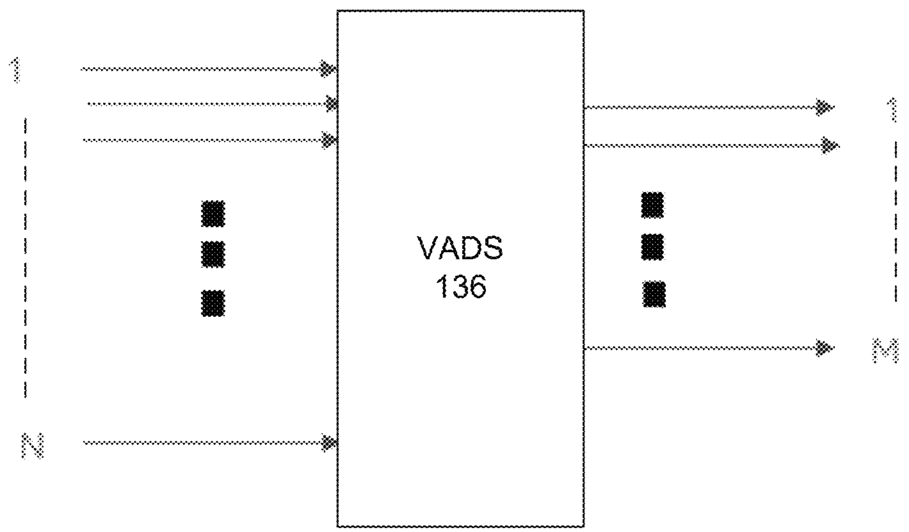
FIG. 4B illustrates a block diagram of virtual audio devices with multiple input and output channels, according to an embodiment.

FIG. 4B illustrates a block diagram of virtual audio devices (VADs) 136 according to various embodiments. VADs 136 may receive N input channels and output M channels. The VADs 136 may process the audio signals, where N represents the number of input channels and M represents the number of output channels that can be configured to match various output device capabilities. The inputs may be shown on the left side of the VADs 136, with arrows indicating the flow of audio signals from channel 1 to channel N. Similarly, the outputs may be shown on the right side, with arrows indicating the processed audio signals flowing from channel 1 to channel M.

In some cases, the APOs 134 may apply various digital signal processing techniques to the input audio channels. For example, the APOs 134 may perform operations such as equalization, dynamic range compression, or spatial audio processing on the input channels. The number of input channels N may be greater than or equal to the number of output channels M, allowing for downmixing or channel reduction if necessary.

The VADsAP 136 may emulate physical audio devices, providing a software-based representation of audio hardware. In some cases, the VADs 136 may be used to create virtual audio endpoints for routing audio between different applications or to simulate specific audio hardware configurations.

The method 300 may process the multichannel audio signal using the APOs 134 and VADs 136 to generate a processed multichannel audio signal for playback over stereo audio device 110. This processing may involve applying various audio effects, spatial audio algorithms, or channel mixing techniques to create an immersive audio experience suitable for playback over the stereo audio device 110.

After processing, the method 300 may output the processed multichannel audio signal for playback over the stereo audio device 110. The audio driver 138 may receive the processed signal from the audio engine 130 and send the signal to the hardware interface 145 for final output to the stereo audio device 110.

Figure 5:
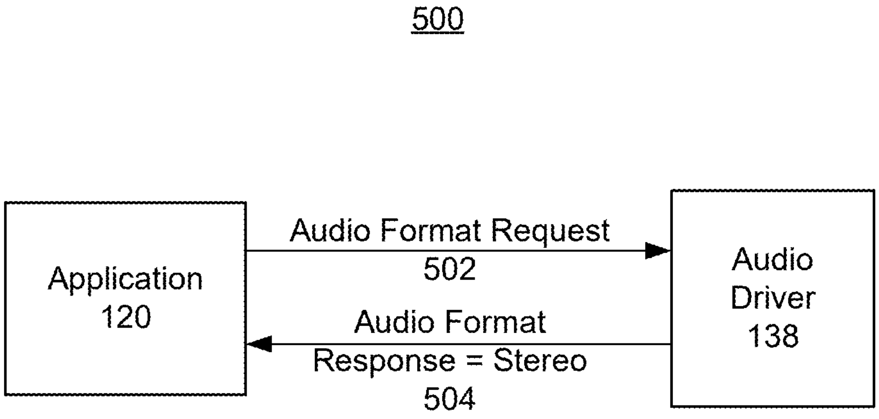
FIG. 5 illustrates a sequence diagram of an audio format negotiation process, according to aspects of the present disclosure.

FIG. 5 illustrates a sequence diagram of a conventional audio format negotiation process according to various embodiments. The sequence diagram shows a method 500 for audio format negotiation between the application 120 and the audio driver 138 when playback is through stereo audio device 110.

The method 500 may begin when the application 120 initiates the format negotiation process by sending an audio format request message 502 to audio engine 130 and audio engine 130 forwards the request to the audio driver 138 or to the virtual audio processing components 132. In response, the audio driver 138 or the virtual audio processing components 132 returns an audio response message 504 to the application 120, indicating that stereo format is supported.

This conventional approach may have several limitations, particularly when it comes to spatial audio processing for playback via stereo audio device 110. The audio driver 138 may typically respond with a stereo format for headphone output, regardless of the capabilities of the virtual audio processing components 132 or the content of the audio signal. In some cases, this limitation may prevent the application 120 from sending multichannel audio signals to the audio engine 130 for processing, even if the virtual audio processing components 132 are capable of handling more than two channels. As a result, the spatial audio information that represents sound positioning in a three-dimensional space may be lost or degraded before reaching the virtual audio processing components 132. The restriction to stereo output for headphone playback may limit the potential for creating immersive spatial audio experiences. While stereo audio may provide some sense of left-right positioning, the conventional approach may not fully utilize the capabilities of modern spatial audio processing techniques, such as those that can simulate height and depth in addition to left-right positioning.

Figure 6:
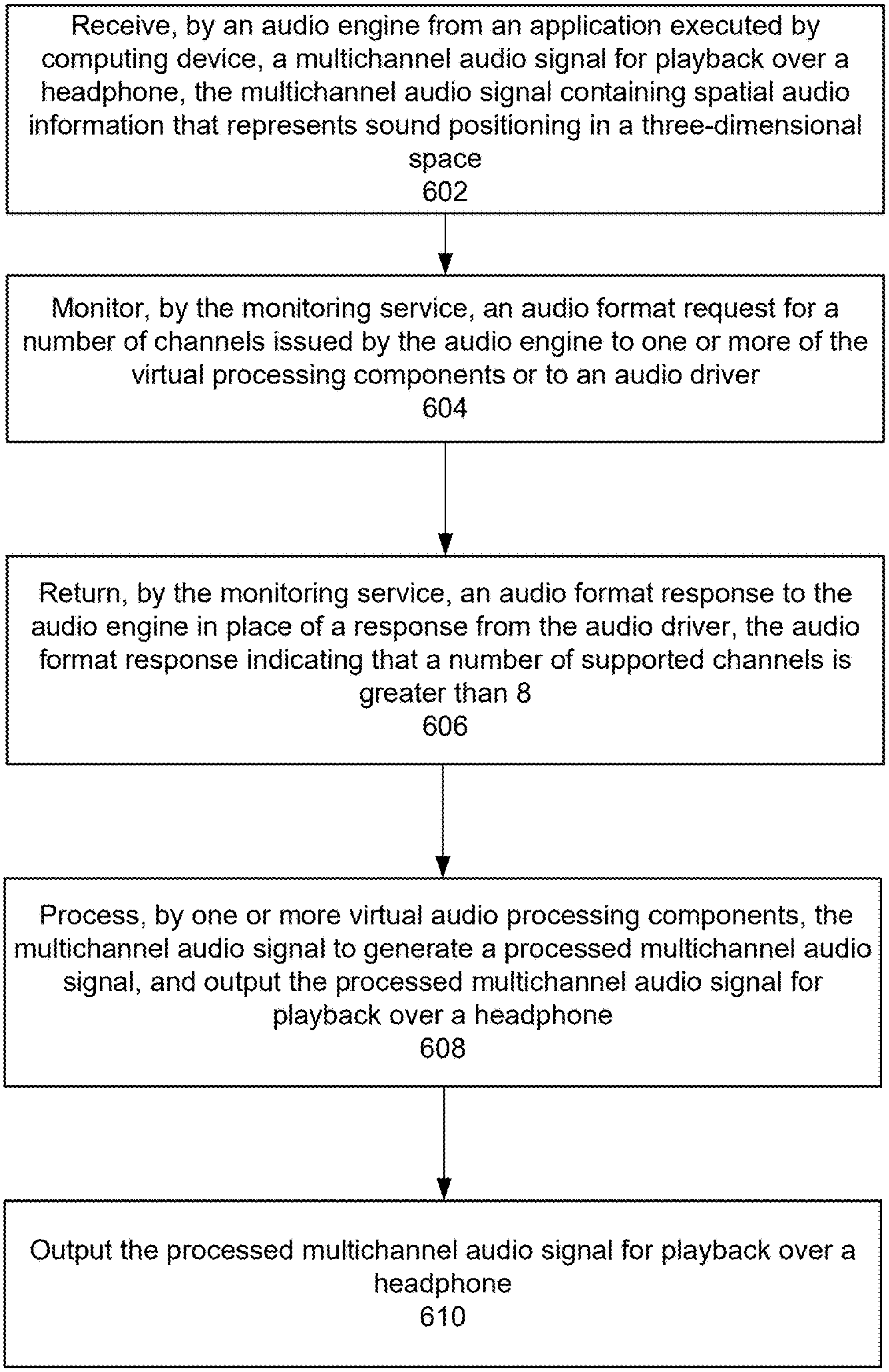
FIG. 6 illustrates a flowchart of a method for processing multichannel audio signals for stereo audio device playback, in accordance with example embodiments.

FIG. 6 illustrates a flowchart of method 600 for processing multichannel audio signals for stereo audio device playback according to various embodiments. The method 600 may overcome the limitations of conventional approaches and enable spatial audio processing for headphone or stereo speaker playback.

The method 600 may begin at step 602, where the audio engine 130 may receive a multichannel audio signal 121 from the application 120 executing on computer system 106. The multichannel audio signal 121 may contain spatial audio information representing sound positioning in three-dimensional space.

In step 604, the monitoring service 140 may monitor an audio format request for a number of channels issued by the audio engine 130 to one or more of the virtual audio processing components 132 or the audio driver 138.

The method 600 may continue with step 606, where the monitoring service 140 may return an audio format response to the audio engine 130 in place of a response from the audio driver 138, where the audio format response indicates that the number of supported channels is greater than 8. For example, in one embodiment, the number of supported channels may range from 8 to 24. Such processing enables the processing of multichannel spatial audio for stereo audio device playback, overcoming the limitations of conventional stereo-only responses.

In some cases, the monitoring service 140 may access application compatibility list 144 that may include a whitelist and/or a blacklist for managing application compatibility with the improved audio format negotiation process. The whitelist may include a list of applications known to work well with the monitoring service 140, while the blacklist may include applications that may be incompatible or may experience issues with the enhanced audio format negotiation. The whitelist and blacklist system may help ensure stability and proper functionality across different software applications. In some cases, the monitoring service 140 may use this system to determine whether to intercept and modify the audio format negotiation process for specific applications, balancing the benefits of enhanced spatial audio processing with maintaining compatibility for a wide range of software applications.

At a step 608, one or more of the virtual audio processing components 132 may process the multichannel audio signal to generate processed multichannel audio signal 142 for stereo audio device playback.

In some cases, the virtual audio processing components 1322 may comprise one or more audio APOs 134, and the monitoring service applies the APOs 134 to the multichannel audio signal 121 for sound enhancement. In one embodiment, the APOs 134 may be configured to process the spatial audio information and output a binaural format for playback over the headphone.

In some cases, the virtual audio processing components 132 may comprise one or more VADs 136, and the monitoring service applies the VADs 136 to the multichannel audio signal 121 to emulate a physical audio device.

In some cases, the virtual audio processing components 132 may comprise audio unit (AU) effects and the OS 128 may comprises macOS®. In other cases, the virtual audio processing components 132 may comprise LADSPA (Linux Audio Developer's Simple Plugin API) and the OS 128 may comprises Linux®.

In some cases, the virtual audio processing components 132 may apply head-related transfer functions (HRTFs) to the processed multichannel audio signal 142 to create a spatial audio effect for headphone playback. The HRTFs are mathematical functions that characterize how an ear receives sound from a point in space, used to create immersive spatial audio experiences. In some cases, the virtual audio processing components 132 may dynamically adjust the HRTFs based on real-time head tracking information of the user 108 wearing the stereo audio device 110. This dynamic adjustment may enhance the spatial audio effect by adapting to the user's 108 head movements, creating a more realistic and immersive listening experience.

The method 600 may conclude with a step 610, where the processed multichannel audio signal 142 may be output for playback over the stereo audio device 110. The processed multichannel audio signal 142 may provide an enhanced spatial audio experience compared to conventional stereo output, allowing the user 108 to perceive sound positioning in three-dimensional space through the stereo audio device 110.

Figure 7:
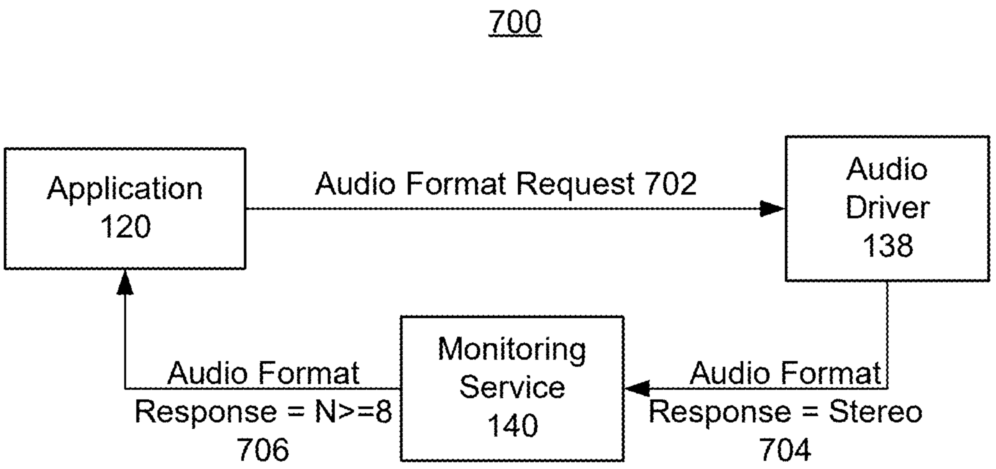
FIG. 7 illustrates a sequence diagram of a modified audio format negotiation process when monitored by the monitoring service according to a first embodiment.

FIG. 7 illustrates a sequence diagram of a modified audio format negotiation process 700 when monitored by the monitoring service 140 according to a first embodiment. The modified audio format negotiation 700 is initiated when application 120 sends an audio format request message 702 through audio engine 130 to the audio driver 138 (or the virtual audio processing components 132) to determine the supported audio channel configuration when playback is through headphones. The audio driver 128 may respond to audio format request message 702 by returning an audio format response message 704 indicating support for a standard two-channel stereo configuration.

In one embodiment, the audio driver 138 may include or comprise a codec. The codec may be a software or hardware component that enables communication between the OS and audio hardware. It may provide an interface for encoding and decoding digital audio data, and may handle tasks such as audio format conversion, sample rate adjustment, and channel mapping. In some cases, the codec may also implement digital signal processing algorithms for audio enhancement or effects. The codec may play a role in the audio format negotiation process by communicating supported audio formats and capabilities to other components of the audio processing system.

According to the disclosed embodiments, monitoring service 140 intercepts the audio format response message 704 from the audio driver 138 or codec and generates a modified response message 706 indicating support for more than 8 channels (N>=8), and returns the modified response to the application 120. In some cases, the monitoring service 140 may indicate that the audio driver 138 supports channel configurations beyond the 7.1.4 format. For example, the monitoring service 140 may modify the audio format response message 704 to indicate support for 9.1.6 (15 channels) or even 22.2 formats (24 channels), providing more precise spatial audio positioning capabilities.

By intercepting and modifying the audio format response, the monitoring service 140 may enable the processing of multichannel spatial audio for headphone playback, overcoming limitations of conventional stereo-only responses.

Figure 8:
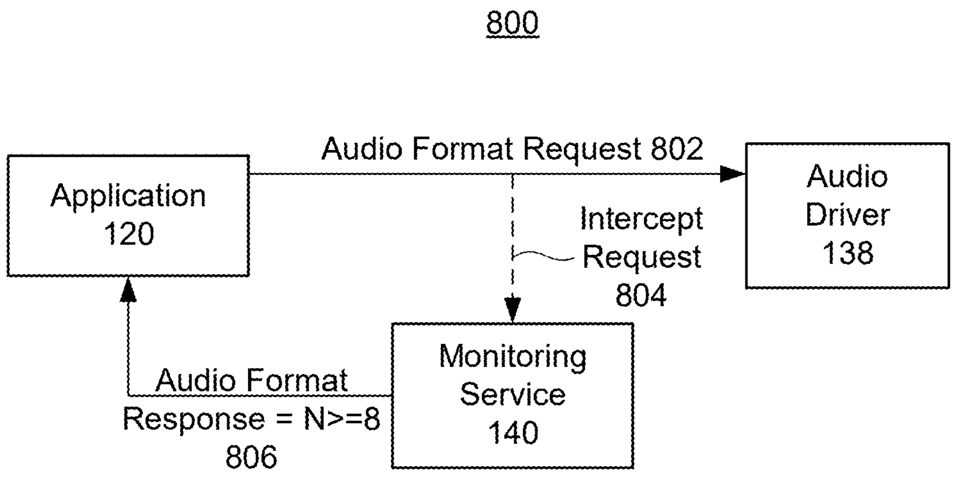
FIG. 8 illustrates a sequence diagram of a modified audio format negotiation process when monitored by the monitoring service according to a second embodiment.

FIG. 8 illustrates a sequence diagram of a modified audio format negotiation process 800 when monitored by the monitoring service 140 according to a second embodiment. The modified audio format negotiation 800 is initiated when application 120 sends an audio format request message 802 through audio engine 130 to the audio driver 138 (or the virtual audio processing components 132) to determine the supported audio channel configuration when playback is through headphones. In some cases, the monitoring service 140 may monitor communications between the application 120 and the audio driver 138 to identify audio format requests.

Rather than modifying the response from the audio driver 138 or codec, the monitoring service 140 may intercept the audio format request message 802 between the application 120 and the audio driver 138 in step 804. After intercepting the request, the monitoring service 140 may generate and send an audio format response message 806 to the application 120 indicating support for more than eight channels (N>=8). In some cases, the monitoring service 140 may prevent the request from reaching the audio driver 138 directly, and in some cases, the monitoring service 140 may not forward the request to the audio driver in this scenario.

The audio format response message 806 generated by the monitoring service 140 may indicate support for a higher number of audio channels than what the audio driver 138 would typically report. For example, while the audio driver 138 may normally indicate support for only two channels (stereo) for headphone playback, the modified channel response 806 may indicate support for 8, 12, 16, or more channels. This modification may enable the application 120 to send multichannel audio data to the audio engine 130 for processing by the virtual audio processing components 132, even when the physical audio hardware only supports stereo output.

By intercepting and modifying audio format requests and/or responses in modified audio format negotiation process 700 and 800, the monitoring service 140 may enable applications to utilize more advanced spatial audio capabilities, even when the underlying audio hardware or drivers do not natively support such features. This approach may allow for more immersive and spatially accurate audio experiences when using the stereo audio device 110, without requiring changes to existing applications or audio content.

The modified audio format negotiation process 700 and 800 may support object-based audio formats such as Dolby Atmos or DTS: X without requiring proprietary decoders. In some cases, the monitoring service 140 may modify or generate the audio format response message 706 and 806 to indicate compatibility with these object-based formats, allowing the virtual audio processing components 132 to process and render these advanced audio formats for headphone playback. By modifying or generating the audio format response message 706 and 806, the monitoring service 140 may enable the application 120 to send multichannel or object-based audio data to the audio engine 130 for processing by the virtual audio processing components 132. This approach may allow for more immersive and spatially accurate audio experiences when using the stereo audio device 110, even with applications or content that were not originally designed for advanced spatial audio playback.

In some cases, the audio processing system 100 may include a user interface for customizing virtual speaker placement. The user interface may allow the user to adjust the perceived positions of virtual speakers in a three-dimensional space. These customized speaker positions may be used by the virtual audio processing components 132 to create a personalized spatial audio experience when processing the multichannel audio data.

The audio processing system 100 may also be capable of processing binaural recordings through the spatial audio system. In some cases, when the application 120 sends a binaural audio stream, the monitoring service 140 may still intercept the audio format request 702 and 802 and respond with support for multichannel audio. The virtual audio processing components 132 may then process the binaural recording, potentially enhancing its spatial characteristics by mapping the binaural audio to a virtual multichannel speaker array before applying spatial audio processing techniques.

Figure 9:
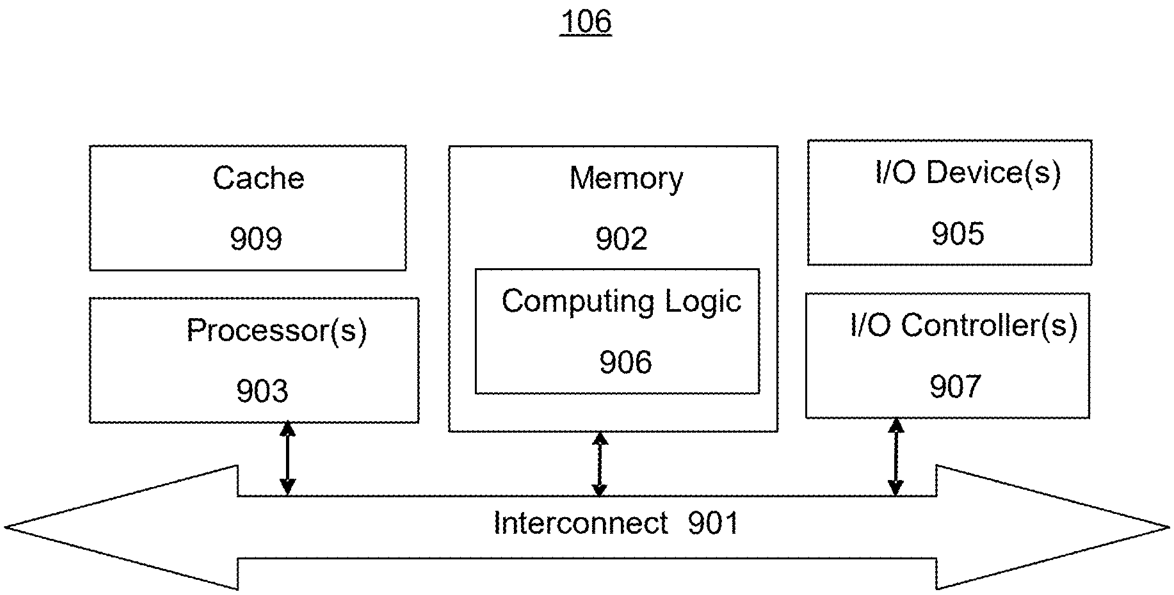
FIG. 9 illustrates a block diagram of a computer system, according to aspects of the present disclosure.

FIG. 9 illustrates a block diagram of the computer system 106 in further detail according to various embodiments. The computer system 106 may include a system interconnect 901 that connects various components of the system for communication and data transfer. A system processor 903 and a system cache 909 may be connected to the system interconnect 901 on one side. A system memory 902 containing computing logic 906 may also be connected to the system interconnect 901. System processor 903 and system memory may be same or different from processor 122 and memory 124. An input/output device 905 and an input/output controller 907 may be also connected to the system interconnect 901. The system interconnect 901 may enable connected components.

The system processor 903 may execute instructions stored in the system memory 902 to perform various tasks related to spatial audio processing. In some cases, the system processor 903 may comprise multiple processing cores or units to handle complex audio processing algorithms efficiently.

The system memory 902 may store instructions and data necessary for the operation of the computer system 106. The computing logic 906 stored in the system memory 902 may include instructions for implementing the monitoring service 140 and virtual audio processing components 132, such as the APOs 134 and VADs 136. In some cases, the computing logic 906 may also include instructions for the monitoring service 140 and the audio engine 130.

The system cache 909 may provide fast access to frequently used data and instructions, improving the overall performance of the computer system 106. In some cases, the system cache 909 may be particularly useful for caching audio processing parameters or frequently accessed audio data.

The input/output device 905 may include various interfaces for connecting external devices, such as the stereo audio device 110. In some cases, the input/output device 905 may also include interfaces for connecting head tracking devices to enable dynamic adjustment of audio processing based on the user's head movements.

The input/output controller 907 may manage data transfer between the system interconnect 901 and the input/output device 905. In some cases, the input/output controller 907 may handle the flow of audio data between the virtual audio processing components 132 and the hardware interface 145.

The audio processing system 100 may integrate with head tracking technology to dynamically adjust audio processing. In some cases, the system processor 903 may receive head tracking data through the input output device 905 and use this information to update the virtual audio processing components 132 in real-time, ensuring that the spatial audio experience remains accurate as the user moves their head.

The computer system 106 may be configured to automatically detect content type and adjust processing algorithms accordingly. In some cases, the computing logic 906 may include instructions for analyzing incoming audio streams from the application 120 and selecting appropriate processing parameters based on whether the content is music, movies, or games.

The audio processing system 100 may synchronize spatial audio processing across multiple output devices simultaneously. In some cases, the system interconnect 901 may facilitate the coordination of audio processing between different output streams, allowing for a seamless spatial audio experience when transitioning between the stereo audio device 110 and other audio output devices.

The computing logic 906 may incorporate machine learning algorithms to improve HRTF selection and create personalized profiles. In some cases, the system processor 903 may execute these algorithms to analyze user preferences and listening patterns, gradually refining the spatial audio processing to better suit individual users.

The audio processing system 100 may include a low-latency processing mode for gaming applications. In some cases, the system processor 903 and system cache 909 may work together to minimize processing delays, ensuring that audio cues in fast-paced games remain accurately synchronized with on-screen action.

The audio processing system 100 may integrate with room correction technology to compensate for acoustic properties of the listening space. In some cases, the input output device 905 may receive data from external microphones or sensors to analyze the room acoustics. The computing logic 906 may then use this information to adjust the virtual audio processing components 132, optimizing the spatial audio output for the specific listening environment.

A number of implementations have been described. Nevertheless, it will be understood that various modifications may be made without departing from the spirit and scope of the disclosure. Accordingly, other implementations are within the scope of the following claims.

The invention claimed is:

1. A method for processing a multichannel audio signal for playback over a stereo audio device, through an operating system (OS) that manages a flow of the multichannel audio signal between applications and the stereo audio device, the method comprising:

receiving the multichannel audio signal containing spatial audio information that represents sound positioning in a three-dimensional space;

monitoring, by a monitoring service, an audio format request for a number of channels issued by an audio engine to one or more virtual audio processing components or to an audio driver;

returning, by the monitoring service, an audio format response to the audio engine in place of a response from the audio driver, wherein the audio format response indicates that a number of supported channels is greater than eight;

processing the multichannel audio signal by one or more virtual audio processing components to generate a processed multichannel audio signal for stereo audio device playback; and outputting the processed multichannel audio signal for playback over the stereo audio device.

2. The method of claim 1, wherein the one or more virtual audio processing components comprise one or more audio processing objects (APOs), wherein the monitoring service applies the one or more APOs to the multichannel audio signal for sound enhancement, the APOs configured to process the spatial audio information and output a binaural format for playback over the stereo audio device.

3. The method of claim 1, wherein the one or more virtual audio processing components comprise one or more virtual audio devices (VADs), wherein the monitoring service applies the one or more VADs to emulate a physical audio device.

4. The method of claim 1, wherein the one or more virtual audio processing components comprise audio unit (AU) effects and the OS comprises macOS.

5. The method of claim 1, wherein the one or more virtual audio processing components comprise LADSPA (Linux Audio Developer's Simple Plugin API) and the OS comprises Linux.

6. The method of claim 1, further comprising:
- intercepting, by the monitoring service, an audio format response from the audio driver indicating support for a two-channel stereo configuration; and
- generating a modified audio format response indicating support for more than eight channels.

7. The method of claim 6, further comprising accessing, by the monitoring service, an application compatibility list to determine whether the monitoring service should return audio format responses for a specific application.

8. The method of claim 1, further comprising:
- intercepting, by the monitoring service, the audio format request; and
- generating the audio format response indicating support for more than eight channels.

9. The method of claim 8, wherein the audio format response indicates support for at least 12 channels.

10. A system for processing a multichannel audio signal for playback over a stereo audio device, the system comprising:
- a processor; and
- a memory storing instructions that, when executed by the processor, cause the system to:
  - receive the multichannel audio signal containing spatial audio information that represents sound positioning in a three-dimensional space;
  - monitor, by a monitoring service, an audio format request for a number of channels issued by an audio engine to one or more virtual audio processing components or to an audio driver;
  - return, by the monitoring service, an audio format response to the audio engine in place of a response from the audio driver, wherein the audio format response indicates that a number of supported channels is greater than eight;
  - process the multichannel audio signal by one or more virtual audio processing components to generate a processed multichannel audio signal for stereo audio device playback; and
  - output the processed multichannel audio signal for playback over the stereo audio device.

11. The system of claim 10, wherein the one or more virtual audio processing components comprise one or more audio processing objects (APOs), and wherein the instructions, when executed by the processor, further cause the system to apply the one or more APOs to the multichannel audio signal for sound enhancement, the APOs configured to process the spatial audio information and output a binaural format for playback over the stereo audio device.

12. The system of claim 10, wherein the one or more virtual audio processing components comprise one or more virtual audio devices (VADs), and wherein the instructions, when executed by the processor, further cause the system to apply the one or more VADs to emulate a physical audio device.

13. The system of claim 10, wherein the instructions, when executed by the processor, further cause the system to:
- intercept, by the monitoring service, an audio format response from the audio driver indicating support for a two-channel stereo configuration; and
- generate the audio format response indicating support for more than eight channels.

14. The system of claim 10, wherein the instructions, when executed by the processor, further cause the system to:
- intercept, by the monitoring service, the audio format request; and
- generate the audio format response indicating support for more than eight channels without forwarding the audio format request to the audio driver.

15. The system of claim 14, wherein the audio format response indicates support for at least 12 channels.

16. The system of claim 10, wherein the instructions, when executed by the processor, further cause the monitoring service to access an application compatibility list to determine whether the monitoring service should return audio format responses for a specific application.

17. A non-transitory computer-readable storage medium storing instructions that, when executed by a processor, cause the processor to perform a method for processing a multichannel audio signal for playback over a stereo audio device, the method comprising:
- receiving the multichannel audio signal containing spatial audio information that represents sound positioning in a three-dimensional space;
- monitoring, by a monitoring service, an audio format request for a number of channels issued by an audio engine to one or more virtual audio processing components or to an audio driver;
- returning, by the monitoring service, an audio format response to the audio engine in place of a response from the audio driver, wherein the audio format response indicates that a number of supported channels is greater than eight;
- processing the multichannel audio signal by one or more virtual audio processing components to generate a processed multichannel audio signal for stereo audio device playback; and
- outputting the processed multichannel audio signal for playback over the stereo audio device.

18. The non-transitory computer-readable storage medium of claim 17, wherein the method further comprises:
- intercepting, by the monitoring service, an audio format response from the audio driver indicating support for a two-channel stereo configuration; and
- generating the audio format response indicating support for more than eight channels.

19. The non-transitory computer-readable storage medium of claim 18, wherein the method further comprises accessing an application compatibility list to determine whether the monitoring service should return audio format responses for a specific application.

20. The non-transitory computer-readable storage medium of claim 17, wherein the method further comprises:
- intercepting, by the monitoring service, the audio format request; and
- generating the audio format response indicating support for more than eight channels.

* * * * *